US012629828B2

(12) United States Patent
Nakamura et al.

(10) Patent No.: US 12,629,828 B2
(45) Date of Patent: May 19, 2026

(54) LIBRARY PRESENTING DEVICE, LIBRARY PRESENTING METHOD, AND ROBOT CONTROL SYSTEM

(71) Applicants: KYOCERA Corporation, Kyoto (JP); Rist Inc., Kyoto (JP)

(72) Inventors: Masayoshi Nakamura, Yokohama (JP); Masafumi Tsutsumi, Yokohama (JP); Tomoyuki Izumi, Tokyo (JP); Kohei Furukawa, Yokohama (JP); Satoshi Muraoka, Zushi (JP); Tatsumasa Kabasawa, Kyoto (JP)

(73) Assignees: KYOCERA Corporation, Kyoto (JP); Rist Inc., Kyoto (JP)

( * ) Notice: Subject to any disclaimer, the term of this patent is extended or adjusted under 35 U.S.C. 154(b) by 61 days.

(21) Appl. No.: 18/681,181

(22) PCT Filed: Aug. 5, 2022

(86) PCT No.: PCT/JP2022/030199
§ 371 (c)(1),
(2) Date: Feb. 5, 2024

(87) PCT Pub. No.: WO2023/013784
PCT Pub. Date: Feb. 9, 2023

(65) Prior Publication Data
US 2024/0278424 A1 Aug. 22, 2024

(30) Foreign Application Priority Data
Aug. 5, 2021 (JP) .................................. 2021-129342

(51) Int. Cl.
B25J 9/16 (2006.01)
G06V 10/70 (2022.01)
G06V 20/64 (2022.01)

(52) U.S. Cl.
CPC ............. B25J 9/1656 (2013.01); B25J 9/161 (2013.01); B25J 9/163 (2013.01); B25J 9/1697 (2013.01);
(Continued)

(58) Field of Classification Search
CPC . B25J 9/1656; B25J 9/161; B25J 9/163; B25J 9/1697; B25J 9/1661; G06V 10/70;
(Continued)

(56) References Cited

U.S. PATENT DOCUMENTS 6,456,901 B1 * 9/2002 Xi .......................... B25J 9/1607
901/41
9,211,640 B2 * 12/2015 Sato ....................... B25J 9/1687
(Continued)

FOREIGN PATENT DOCUMENTS

CN 110549329 A * 12/2019 .............. B25J 9/161
CN 113626090 A * 11/2021 .............. G06F 18/23
(Continued)

OTHER PUBLICATIONS

CN-113626090-A translation (Year: 2021).*
CN-116276998-A translation (Year: 2023).*
CN-110549329-A translation (Year: 2019).*

*Primary Examiner* — Kyle T Johnson
(74) *Attorney, Agent, or Firm* — Procopio, Cory, Hargreaves & Savitch LLP

(57) ABSTRACT

A library presenting device, a library presenting method, and a robot control system for presenting a library suitable for a target object. The library presenting device (10) includes an input information acquisition unit (131) that acquires input information including the target object; a result acquisition unit (132) capable of acquiring a result of applying a defined task with respect to the target object, using libraries capable of executing tasks with respect to the target object; an evaluation acquisition unit (133) that acquires an evaluation (Continued)

of the result of applying the defined task; and a presentation content determination unit (134) that determines, based on the evaluation of the result of applying the defined task using a first library among the libraries, output of a result of applying the defined task using a second library among the libraries that is different from the first library.

10 Claims, 6 Drawing Sheets

(52) U.S. Cl.
CPC .............. *G06V 10/70* (2022.01); *G06V 20/64* (2022.01); *G06V 2201/07* (2022.01)

(58) Field of Classification Search
CPC .... G06V 20/64; G06V 2201/07; G06N 3/008; G06N 20/00
See application file for complete search history.

(56) References Cited

U.S. PATENT DOCUMENTS

| | | | |
|---|---|---|---|
| 2019/0005360 A1* | 1/2019 | Heide .................... | G06N 20/00 |
| 2019/0196436 A1* | 6/2019 | Nagarajan ................ | B25J 9/163 |
| 2019/0291277 A1* | 9/2019 | Oleynik ................ | B25J 9/1669 |
| 2021/0004589 A1* | 1/2021 | Turkelson ............ | G06V 10/809 |
| 2021/0138644 A1* | 5/2021 | Zhang .................... | B25J 13/089 |
| 2023/0111284 A1* | 4/2023 | Gildert .................. | B25J 9/1661 |
| | | | 700/250 |
| 2023/0376857 A1* | 11/2023 | Gokalp ............ | G06F 16/24578 |
| 2024/0278424 A1* | 8/2024 | Nakamura ............. | B25J 9/1697 |
| 2025/0050502 A1* | 2/2025 | Bunno .................... | B25J 19/06 |

FOREIGN PATENT DOCUMENTS

| | | | | |
|---|---|---|---|---|
| CN | 116276998 A | * | 6/2023 | .............. B25J 9/163 |
| EP | 4230361 A1 | * | 8/2023 | ............. B25J 9/1633 |
| JP | 2013158869 A | | 8/2013 | |
| JP | 2021-30407 A | | 3/2021 | |
| WO | 2020/250039 A1 | | 12/2020 | |

* cited by examiner

FIG. 4

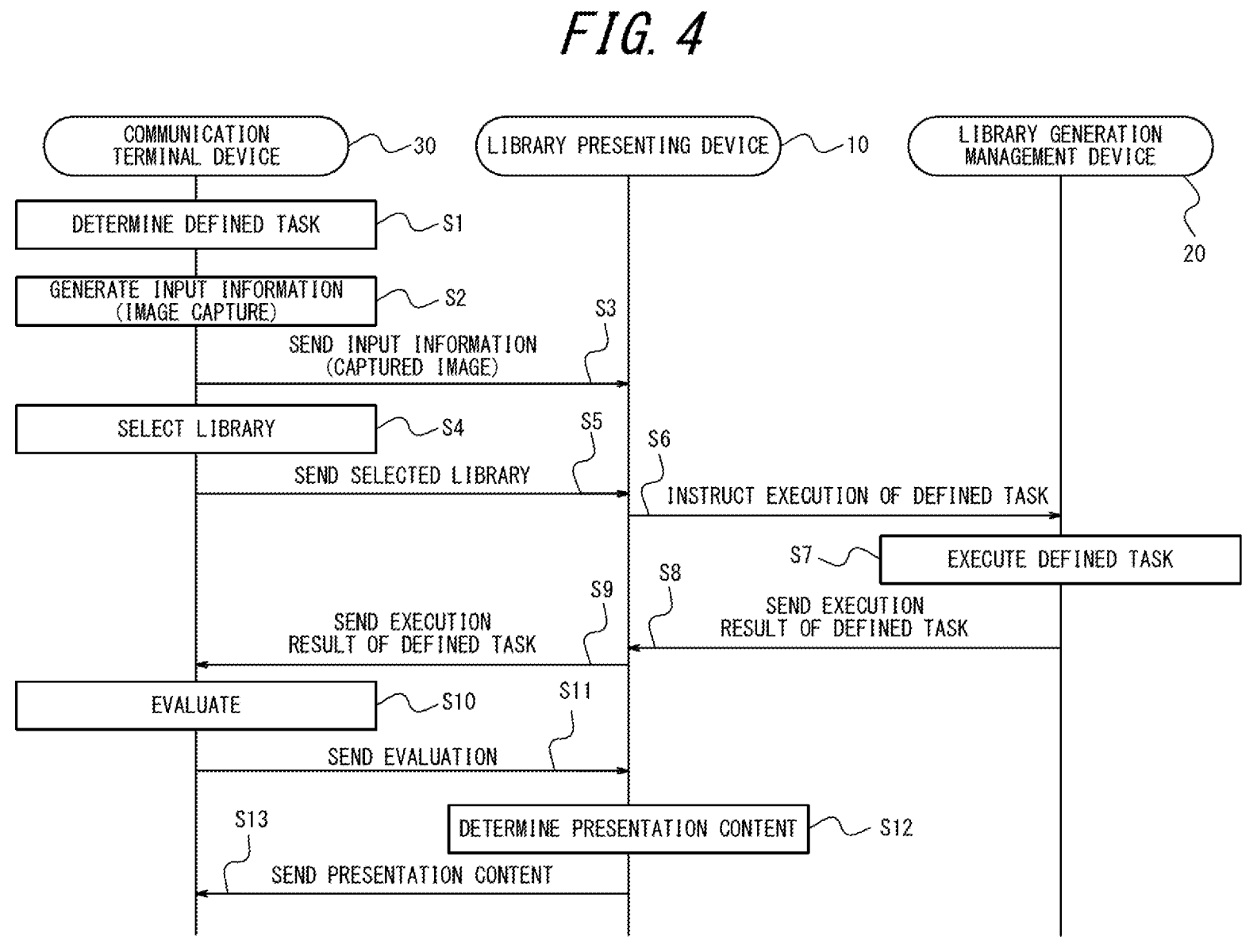

LIBRARY GENERATION MANAGEMENT DEVICE    20

LIBRARY PRESENTING DEVICE    10

COMMUNICATION TERMINAL DEVICE    30

DETERMINE DEFINED TASK    S1

GENERATE INPUT INFORMATION (IMAGE CAPTURE)    S2

SEND INPUT INFORMATION (CAPTURED IMAGE)    S3

SELECT LIBRARY    S4

SEND SELECTED LIBRARY    S5

INSTRUCT EXECUTION OF DEFINED TASK    S6

EXECUTE DEFINED TASK    S7

SEND EXECUTION RESULT OF DEFINED TASK    S8

SEND EXECUTION RESULT OF DEFINED TASK    S9

EVALUATE    S10

SEND EVALUATION    S11

DETERMINE PRESENTATION CONTENT    S12

SEND PRESENTATION CONTENT    S13

FIG. 6

LIBRARY PRESENTING DEVICE, LIBRARY PRESENTING METHOD, AND ROBOT CONTROL SYSTEM

CROSS-REFERENCE TO RELATED APPLICATION

The present application claims priority to and the benefit of Japanese Patent Application No. 2021-129342 filed Aug. 5, 2021, the entire contents of which are incorporated herein by reference.

TECHNICAL FIELD

The present disclosure relates to a library presenting device, a library presenting method, and a robot control system.

BACKGROUND

Conventional devices are known that identify objects in images by machine learning and the like, using training images. For example, Patent Literature (PTL) 1 describes a robot that may be used even by unskilled workers to perform tasks by recognizing various objects from images.

CITATION LIST

Patent Literature

PTL 1: JP 2021-030407 A

SUMMARY

A library presenting device according to an embodiment of the present disclosure comprises:

an input information acquisition unit configured to acquire input information including a target object;

a result acquisition unit capable of acquiring a result of applying a defined task with respect to the target object, using libraries capable of executing tasks with respect to the target object;

an evaluation acquisition unit configured to acquire an evaluation of the result of applying the defined task; and a presentation content determination unit configured to determine, based on the evaluation of the result of applying the defined task using a first library among the libraries, output of a result of applying the defined task using a second library among the libraries that is different from the first library.

A library presenting method according to an embodiment of the present disclosure is a library presenting method executed by a library presenting device, and comprises:

acquiring input information including a target object;

acquiring a result of applying a defined task with respect to the target object, using libraries capable of executing tasks with respect to the target object;

acquiring an evaluation of the result of applying the defined task; and determining, based on the evaluation of the result of applying the defined task using a first library among the libraries, output of a result of applying the defined task using a second library among the libraries that is different from the first library.

A robot control system according to an embodiment of the present disclosure comprises:

a robot; and a robot control device configured to download a library presented by a library presenting device to control the robot, wherein the library presenting device comprises:

an input information acquisition unit configured to acquire input information including a target object;

a result acquisition unit capable of acquiring a result of applying a defined task with respect to the target object, using libraries capable of executing tasks with respect to the target object;

an evaluation acquisition unit configured to acquire an evaluation of the result of applying the defined task; and a presentation content determination unit configured to determine, based on the evaluation of the result of applying the defined task using a first library among the libraries, output of a result of applying the defined task using a second library among the libraries that is different from the first library.

BRIEF DESCRIPTION OF THE DRAWINGS

In the accompanying drawings:

FIG. 4 is a sequence diagram illustrating an example of processing procedure in a library presenting system;

FIG. 6 is a sequence diagram illustrating another example of processing procedure in a library presenting system.

DETAILED DESCRIPTION

The following describes a library presenting device, a library presenting method, and a robot control system according to an embodiment of the present disclosure, with reference to the drawings. In each drawing, identical or equivalent parts are marked with the same reference sign. In description of the present embodiment, description of identical or equivalent parts is omitted or simplified as appropriate.

(Library Presenting System Overview)

Figure 1:
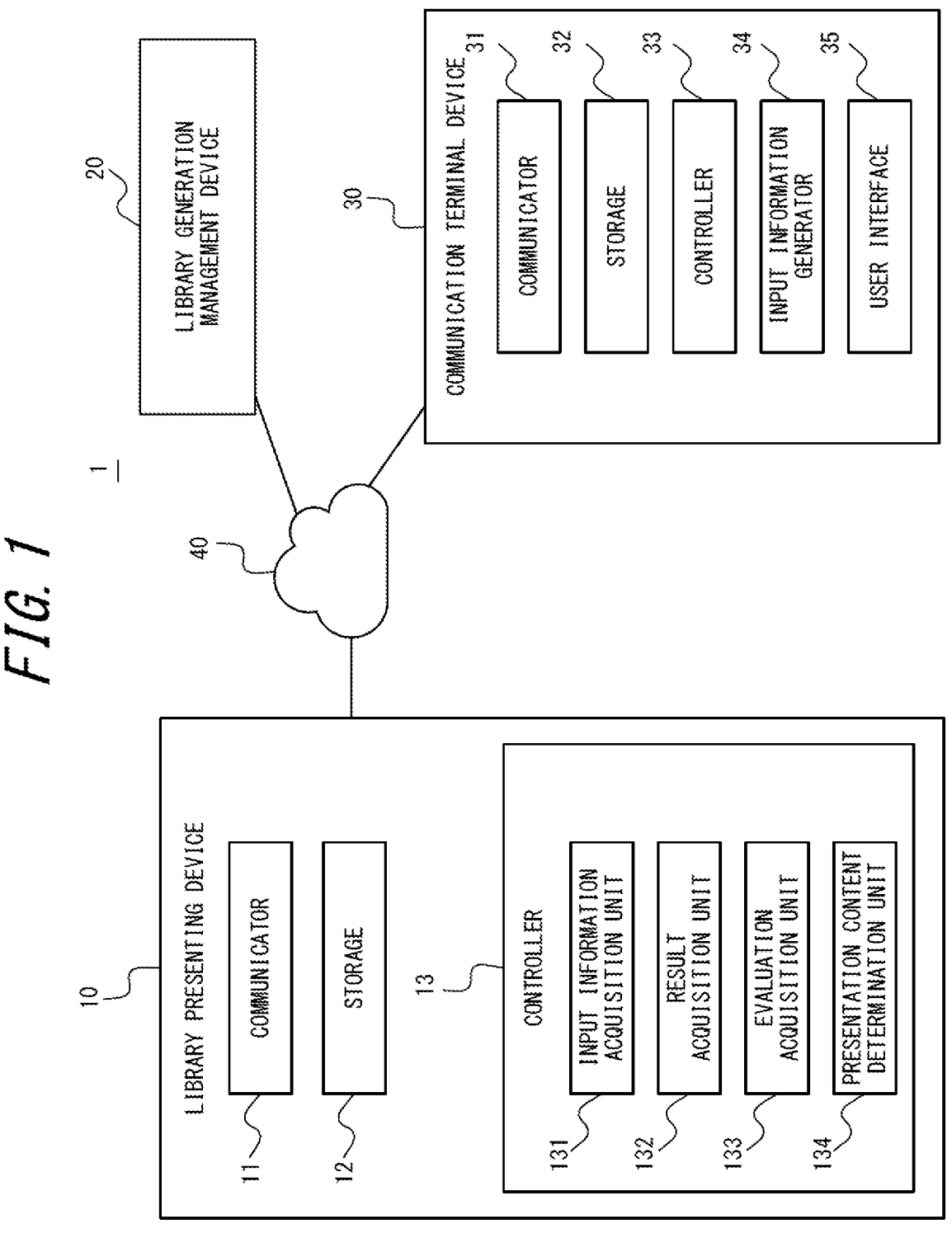
FIG. 1 is a diagram illustrating an example configuration of a library presenting system including a library presenting device according to an embodiment.

FIG. 1 illustrates an example configuration of a library presenting system 1 including a library presenting device 10 according to the present embodiment. The library presenting device 10 is a device that presents a library suitable for a defined task when a user executes the defined task. The defined task is processing executed based on a result of recognizing a target object, such as object recognition or identification, display of an identification result, object grasp position recognition, or the like. Libraries are user-available recognition models, recognition programs, and the like. A user may download and use a library via a network 40, for example. According to the present embodiment, a library includes, but is not limited to, at least one machine learning model (trained model) generated by machine learning to enable a task such as described above to be executed.

The library presenting device 10 includes a communicator 11, a storage 12, and a controller 13. The controller 13 includes an input information acquisition unit 131, a result acquisition unit 132, an evaluation acquisition unit 133, and a presentation content determination unit 134. The library presenting device 10 may be a computer, such as a server or the like, as a hardware configuration. Details of components of the library presenting device 10 are described later.

The library presenting device 10, together with a library generation management device 20 and a communication terminal device 30 connected by the network 40, may constitute the library presenting system 1. The network 40 is, for example, the Internet, but may be a local area network (LAN). For example, the library presenting device 10 and the library generation management device 20 may execute communication via a LAN, and the library presenting device 10 and the communication terminal device 30 may execute communication via the Internet.

The library generation management device 20 generates libraries and manages a library group of multiple libraries. The library generation management device 20 is able to generate a library by using training data to generate at least one trained model. The library generation management device 20 may generate a new library (for example, a custom library as described later) by machine learning. The library generation management device 20 may execute a library update (additional learning or relearning) using new training data, a library addition and a library deletion as management of a library group. Further, the library generation management device 20 may execute a defined task using a specified library, and output an execution result.

According to the present embodiment, the library generation management device 20 is able to access the storage 12 of the library presenting device 10 and manages a library group stored in the storage 12. Further, according to the present embodiment, the library generation management device 20 is a computer separate from the library presenting device 10 that is able to communicate with the library presenting device 10, but is not limited to such a configuration. For example, the library generation management device 20 may be realized by a computer integrated with the library presenting device 10. In such a case, the library generation management device 20 may include components of the library presenting device 10, and the library presenting device 10 may include components of the library generation management device 20.

The communication terminal device 30 is a general-purpose communication terminal device such as, but not limited to, a smartphone, a tablet device, or the like. The communication terminal device 30 may, as another example, be part of a robot control system 100 (see FIG. 2) described later. The communication terminal device 30 generates input information (for example, an image of an identification target object) and outputs the input information to the library presenting device 10. The communication terminal device 30 also presents to a user presentation content (for example, a library suitable for a defined task) output by the library presenting device 10. The communication terminal device 30 includes a communicator 31, a storage 32, a controller 33, an input information generator 34, and a user interface 35. Details of components of the communication terminal device 30 are described later.

Figure 2:
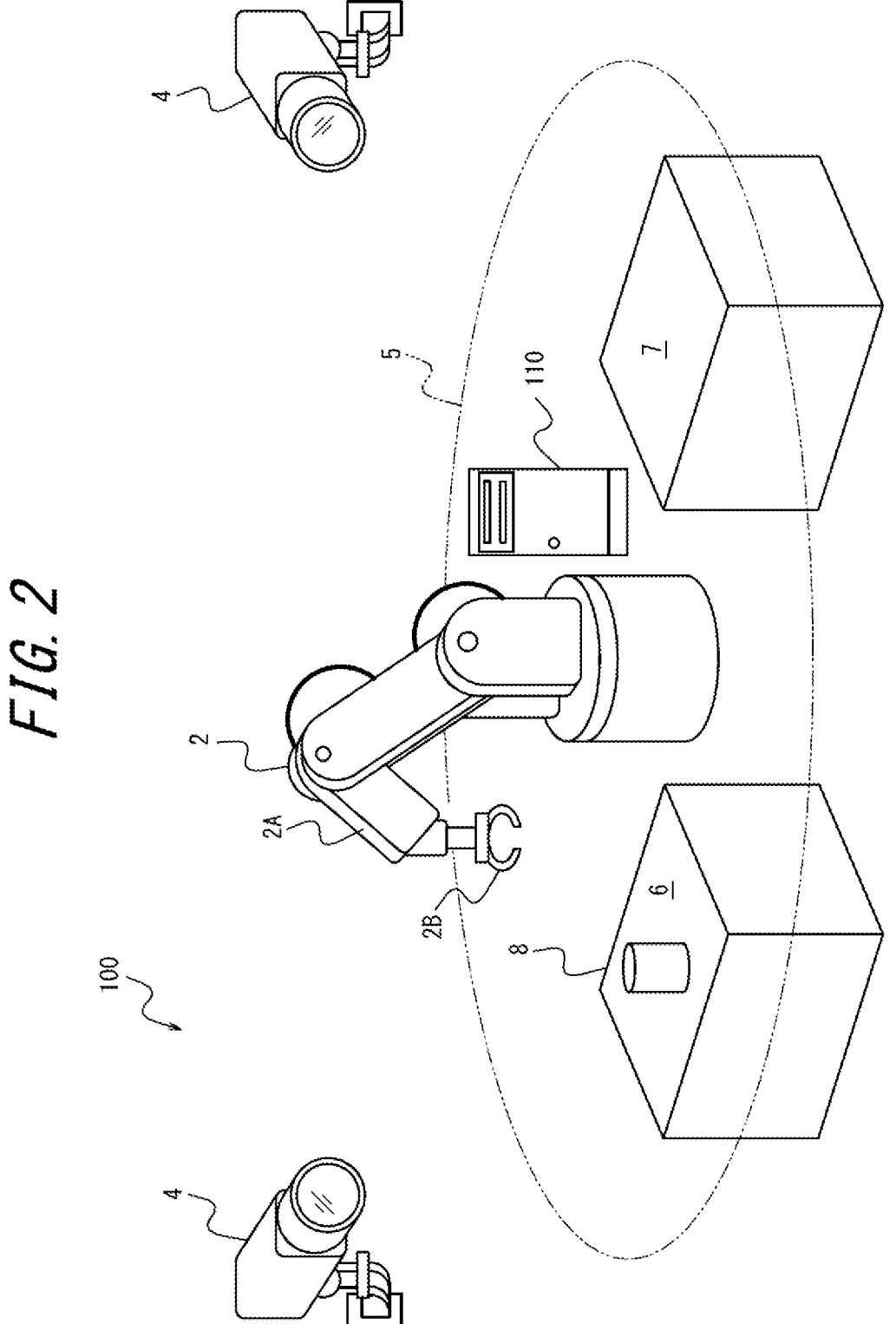
FIG. 2 is a schematic diagram illustrating an example configuration of a robot control system.

FIG. 2 is a schematic diagram illustrating an example configuration of the robot control system 100. The robot control system 100 includes a robot 2 and a robot control device 110. The robot 2 moves a work target object 8 from a work start point 6 to a work target point 7 by means of an end effector 2B (grasping hand) at the end of an arm 2A. That is, the robot control device 110 controls the robot 2 so that the work target object 8 moves from the work start point 6 to the work target point 7. The robot control system 100 includes a camera 4. The camera 4 captures images of items and the like in an influence zone 5 that may affect operation of the robot 2.

The robot control device 110 recognizes the work target object 8 present in a space where the robot 2 works based on images captured by the camera 4. Recognition of the work target object 8 is executed using a library (trained model generated to recognize the work target object 8) included in the library group. The robot control device 110 downloads and deploys a library via the network 40 before executing recognition of the work target object 8.

Here, for example, the library group preferably includes many libraries so that many types of the work target object 8 may be recognized in the robot control system 100. However, when many libraries are present, selecting an appropriate library for the type of the work target object 8 may be difficult for a user. Further, before incorporating the robot control system 100, a user may want to know whether a target object can be properly recognized using a library in the library group. Further, even after the robot control system 100 has been incorporated, a user may want to know whether a new work target object 8 can be recognized.

As explained below, the library presenting device 10 is able to output a library suitable for a defined task (for example, identification of a target object and display of an identification result) using input information from the communication terminal device 30 (for example, an image including a target object to be identified). According to the present embodiment, the communication terminal device 30 is a tablet device held by a user, but when a user has incorporated the robot control system 100, a part of the robot control system 100 (the robot control device 110, the camera 4, and the like) may function as the communication terminal device 30.

(Library Presenting Device Configuration)

Components of the library presenting device 10 are described in detail below. The communicator 11 includes at least one communication module configured to connect to the network 40. The communicator 11 may include, for example, a communication module compatible with a mobile communication standard such as 4G (fourth generation) or 5G (fifth generation). The communicator 11 may include, for example, a communication module compatible with a wired LAN standard (1000 BASE-T as an example). The communicator 11 may include, for example, a communication module compatible with a wireless LAN standard (IEEE 802.11 as an example).

The storage 12 includes at least one memory. The memory may be any memory, including but not limited to semiconductor memory, magnetic memory, or optical memory, for example. The storage 12 may be built into the library presenting device 10, for example, and may be configured to be accessed externally from the library presenting device 10 via any interface.

The storage 12 stores various data used in various calculations executed by the controller 13. Further, the storage 12 may store results and intermediate data of various calculations executed by the controller 13.

The storage 12 is accessed by the library generation management device 20 as described above. That is, the storage 12 is shared by the library presenting device 10 and the library generation management device 20. According to the present embodiment, the storage 12 stores a library group (multiple libraries).

The controller 13 is at least one processor. The processor may be, but is not limited to, a general-purpose processor or a dedicated processor specialized for particular processing, and may be any processor. The controller 13 controls overall operation of the library presenting device 10.

Here, the library presenting device 10 may have the following software configuration. At least one program used to control operation of the library presenting device 10 is stored in the storage 12. The program stored in storage 12, when read by the processor of the controller 13, causes the controller 13 to function as the input information acquisition unit 131, the result acquisition unit 132, the evaluation acquisition unit 133, and the presentation content determination unit 134.

The input information acquisition unit 131 acquires input information from the communication terminal device 30. As described above, for example, a user uses the library presenting device 10 when wanting to know whether a task with respect to a new target object is executable using a library in the library group. The input information is information that includes the target object. Specifically, according to the present embodiment, the input information is an image of the target object, but the input information is not limited to an image. The input information may be acquired from the communication terminal device 30 or the robot control device 110, and for example, may be user information or information on the robot 2 to be used.

The result acquisition unit 132 acquires a result of applying a defined task to the target object included in the input information. In more detail, the result acquisition unit 132 acquires the result of the library generation management device 20 executing the defined task using a specified library. According to the present embodiment, the defined task is recognition of the target object and display of a recognition result. For example, when the defined task is executed with respect to an image including multiple target objects (such as industrial components), recognition (identification of bolts, nuts, springs, and the like) is executed with respect to each of the multiple target objects, and the recognition result (names of bolts, nuts, springs, and the like) is overlaid on the image and output.

The result of applying the defined task using the specified library is not limited to an actual execution result, and may be a result of calculation in a simulation. Simulation may include, for example, not only target object recognition, but also target object grasping and the like that is difficult to actually execute. For example, the result acquisition unit 132 may execute a 3D simulation according to the target object after recognizing the target object from the input information, and acquire a result of grasping. Further, a 3D model in the 3D simulation may be synthesized from, for example, CAD data, RGB information, depth information, and the like regarding the target object.

The evaluation acquisition unit 133 acquires an evaluation of the result of applying the defined task. According to the present embodiment, the evaluation is at least one of, but not limited to, precision or recall. The evaluation may include a visual judgment of "acceptable" or "unacceptable" from a user. The evaluation acquisition unit 133 may acquire the evaluation entered by a user into the communication terminal device 30. As another example, the evaluation acquisition unit 133 may acquire an expected result (at least one of expected precision or recall) entered by a user into the communication terminal device 30, rather than an evaluation itself. When acquiring the expected result for the defined task, the evaluation acquisition unit 133 may determine whether the result of applying the defined task based on the expected result is greater than or equal to the expected result and use that determination as the evaluation. When, for example, the expected result is set in advance, the evaluation acquisition unit 133 may make a determination of the result of application and make the evaluation without the evaluation acquisition unit 133 receiving input from a user.

The presentation content determination unit 134 determines presentation content based on the evaluation acquired by the evaluation acquisition unit 133 and sends the determined presentation content to the communication terminal device 30. When the evaluation is less than a defined criterion, the presentation content determination unit 134 may, for example, specify a different library or a combination of multiple libraries including a different library to be applied to the defined task, and make the presentation content an application result the different library or the combination of multiple libraries including the different library and the application result thereof. The presentation content may include, for example, a library when the evaluation is less than a defined criterion. Details of the determination of the presentation content by the presentation content determination unit 134 are described later.

(Communication Terminal Device Configuration)

Components of the communication terminal device 30 are described in detail below. The communicator 31 includes at least one communication module configured to connect to the network 40. The communicator 31 may include a communication module compatible with a mobile communication standard such as 4G or 5G, for example. The communicator 31 may include a communication module compatible with a LAN standard. The communicator 31 may include the same communication module as the communicator 11, and may include a different communication module.

The storage 32 includes at least one memory. The memory may be any memory, including but not limited to semiconductor memory, magnetic memory, or optical memory, for example. The storage 32 stores various data used in various calculations executed by the controller 33. Further, the storage 32 may store results and intermediate data of various calculations executed by the controller 33. For example, the storage 32 may temporarily store input information that is generated by the input information generator 34 and sent (uploaded) to the library presenting device 10. Further, for example, the storage 32 may temporarily store the presentation content acquired from the library presenting device 10 via the communicator 31.

The controller 33 is at least one processor. The processor may be, but is not limited to, a general-purpose processor or a dedicated processor specialized for particular processing, and may be any processor. The controller 33 controls overall operation of the communication terminal device 30.

The input information generator 34 generates input information. As described above, according to the present embodiment, the input information is an image including the target object to be identified. The input information generator 34 may include an imaging unit such as a camera, for example. According to the present embodiment, the input information generator 34 is a camera. For example, when a user wants to know whether a new target object can be recognized by the library presenting device 10, the user may generate the input information by capturing an image including the new target object with the camera of the communication terminal device 30.

The user interface 35 inputs information from a user and outputs information to the user. The user interface 35 includes, for example, a touch sensor. The touch sensor detects contact with a user's finger, stylus pen, or the like, and specifies a contact position. The touch sensor may be integrated with a display to form a touch panel display. According to the present embodiment, the user interface 35 is a touch panel display. The presentation content from the library presenting device 10 is displayed on the touch panel display. The user interface 35 may display a chat screen or the like to prompt input when a user is to decide on a defined task, decide on a library, input evaluation and expected result, or the like.

(Library Group)

Figure 3:
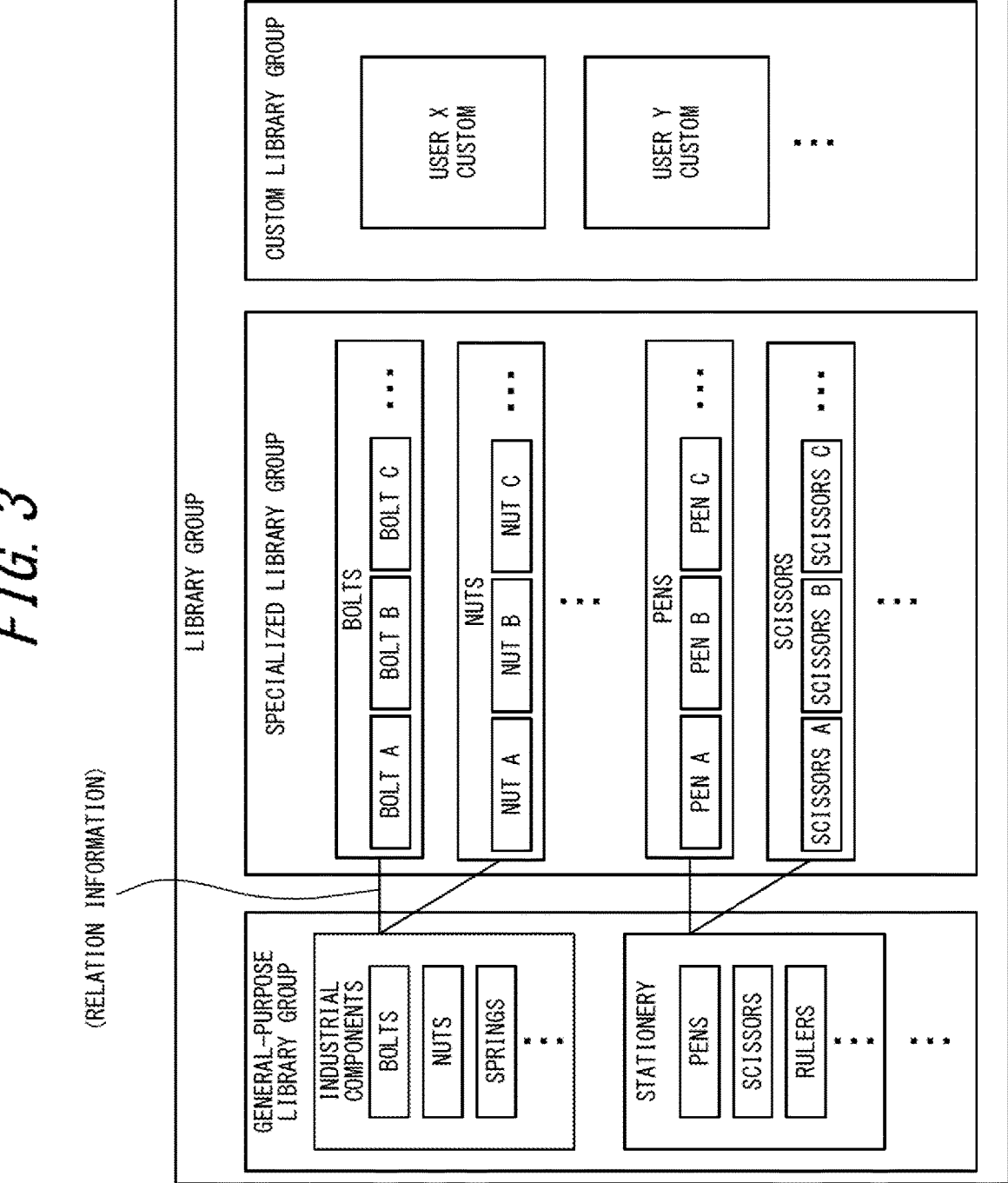
FIG. 3 is a diagram illustrating an example configuration a library group.

According to the present embodiment, the library group stored in the storage 12 is broadly classified into three categories as illustrated in FIG. 3. The library group includes a general-purpose library group, a specialized library group, and a custom library group. The general-purpose library group includes multiple general-purpose libraries for recognizing target objects in a large category (first category). The specialized library group includes multiple specialized libraries for recognizing target objects in a smaller category (second category). The second category is a subdivision of one item in the first category. Further, the custom library group includes multiple custom libraries generated by user-prepared training data.

In the example in FIG. 3, the first category is industrial components, stationery, and the like. The second category is bolts, nuts, pens, scissors, and the like. For example, the general-purpose library "INDUSTRIAL COMPONENTS" is used to recognize bolts, nuts, springs, and the like. For example, the specialized library "BOLTS" is a library for recognizing bolt types, such as Bolt A, Bolt B, Bolt C, and the like. The specialized libraries "BOLTS" and "NUTS" are associated with the general-purpose library "INDUSTRIAL COMPONENTS". Such associations between general-purpose libraries and specialized libraries are stored in the storage 12 as relation information. That is, the storage 12 stores relation information that defines association between multiple libraries. Further, for the custom library group, association between a custom library and a user, association between a general-purpose library and a custom library, or an association between a specialized library and a custom library may be stored in the storage 12 as relation information. Further, similarities among multiple general-purpose libraries, similarities among multiple specialized libraries, and the like may be stored in the storage 12 as relation information. Further, a usage history of use of a general-purpose library, a specialized library, or a custom library, a combination of multiple general-purpose libraries, multiple specialized libraries, or multiple custom libraries may be stored in the storage 12 as relation information.

Based on the relation information, the presentation content determination unit 134 may, for example, cause the result acquisition unit 132 to acquire an application result of applying the defined task using a second library that has a defined association with a library specified by a user (first library). For example, a user might use the library presenting device 10 to check whether "BOLT C'", an improved product of "BOLT C", is recognizable using a library in a library group. In such a case, the user may specify "INDUSTRIAL COMPONENTS" in the general-purpose library, as the user does not know the details of library type. In such a case, the presentation content determination unit 134 may not only cause the library generation management device 20 to execute recognition of "BOLT C'" using "INDUSTRIAL COMPONENTS" (general-purpose library, first library), but also using "BOLT" (specialized library, second library) based on relation information. The presentation content determination unit 134 may then cause the result acquisition unit 132 to acquire each execution result. When the evaluation with respect to an execution result of the defined task using the first library is less than a defined criterion, the presentation content determination unit 134 may, for example, cause presentation of an execution result of the defined task using the second library. When the evaluation is less than the defined criterion, the precision and the recall are less than the expected result, for example. By using the relation information, the presentation content determination unit 134 may select a candidate library suitable for execution of the defined task, even when a user does not know much about the type of library. Here, for example, where there are multiple second libraries associated with the first library, the presentation content determination unit 134 may execute and evaluate for each of the multiple second libraries. Further, when the evaluation with respect to an execution result of the defined task using a previous library (for example, the first library) is less than the defined criterion, the presentation content determination unit 134 may cause the result acquisition unit 132 to acquire an application result of the defined task using a subsequent library (for example, the second library).

Further, the presentation content determination unit 134 may, for example, cause the result acquisition unit 132 to acquire an execution result of the defined task using a portion of multiple second libraries based on relevance of the relation information. The relevance may be, for example, the frequency of use of the library in the past by a user or the robot 2 to be used. Further, when multiple second libraries are associated with the first library, the presentation content determination unit 134 may set priorities for the multiple second libraries and cause the result acquisition unit 132 to acquire an execution result of the defined task using the second library with the highest priority. Further, in such a case, the presentation content determination unit 134 may cause sequential evaluation of the second libraries and completion of acquisition of the execution result by the result acquisition unit 132 when evaluation is greater than or equal to a defined criterion. Priority may be set based on frequency of use of a library in the past by a user or the robot 2 to be used, for example.

Further, the presentation content determination unit 134 may cause the result acquisition unit 132 to acquire the execution result of the defined task using a custom library (third library) generated by a user in the past, based on relation information. Where there are multiple third libraries associated with the first library, the presentation content determination unit 134 may execute and evaluate for each of the multiple third libraries. Further, the presentation content determination unit 134 may cause presentation of the third library, for example. Further, the first library may be used in combination with another library (for example, the second library). Further, the second library may be used in combination with another library (for example, the third library). That is, the result acquisition unit 132 may acquire a result of executing the defined task with respect to a combination of multiple libraries. The presentation content determination unit 134 may, for example, compare evaluations of multiple library combinations and cause presentation of the best combination of libraries and the execution result of the defined task using the best combination of libraries. The presentation content determination unit 134 may, for example, cause presentation of the execution result of the defined task using a combination of the third library and the second library. For example, "INDUSTRIAL COMPONENTS" of the first library and "BOLTS" of the second library may be combined (both used) to execute target object recognition as the defined task. In this example, when the target object is "BOLT B", the execution result is expected to correctly recognize the target object as "BOLT B", but when the target object is "NUT B", the target object may simply be recognized as a nut.

When the evaluation with respect to the execution result of the defined task using the second library is less than the defined criterion, the presentation content determination unit 134 may present a proposal for generation of a new library. A new library is a new custom library. For example, a user may create training data from an image including "BOLT C'" and have the library generation management device 20 generate a new library using the training data.

Thus, the presentation content determination unit 134 not only causes the execution result of the defined task using the library specified by the user (first library) to be presented, but also causes the second library, the third library, and combinations of these libraries to be presented along with the execution result, depending on the evaluation. Further, the presentation content determination unit 134 causes a proposal for the generation of a new library to be presented. A proposal for generating a new library may be made when "BOLT C'" in the above example is not recognized, when "BOLT C'" is misclassified as "BOLT A" or the like, and when "BOLT C'" is not classified in detail by type.

Here, in the above example, the first library is a general-purpose library, the second library is a specialized library, and the third library is a custom library, but these correspondences are not limiting. For example, the second library may be a general-purpose library and the third library may be a specialized library. In such a case, for example, when the first library specified by a user is "INDUSTRIAL COMPONENTS" then "STATIONERY" or the like may be applied as the second library, "PEN" as the third library, etc. For example, the first library may be a general-purpose library and the second library may be a custom library. In such a case, for example, when the first library specified by a user is "INDUSTRIAL COMPONENTS", then "BOLT C'" may be applied as the second library. The first library may be a specialized library or a custom library. In such a case, for example, when the first library specified by a user is "BOLT A", then "BOLT B" may be applied as the second library and "BOLT C" may be applied as the third library, or when the first library specified by a user is "BOLT C'", then "BOLT C" may be applied as the second library and "BOLT D'" may be applied as the third library.

Further, in the above example, the third library is set based on relation information with the first library, but the third library may be set based on relation information with the second library or both the first library and the second library. In such a case, for example, when the first library is "INDUSTRIAL COMPONENTS", then "STATIONERY" or the like may be applied as the second library and "PEN" or the like may be applied as the third library, or when the first library is "INDUSTRIAL COMPONENTS" and the second library is "BOLT C", then "BOLT C'" may be applied as the third library.

Further, the combination of libraries is not particularly limited. In the above example, the result acquisition unit 132 acquires the result of executing the defined task when, for example, a combination of multiple general-purpose libraries or a general-purpose library and a specialized library are applied. The result acquisition unit 132 may acquire the result of executing the defined task when, for example, a combination of multiple specialized libraries, multiple custom libraries, a specialized library and a custom library, or a generic library and a custom library are applied.

(Library Presenting Method)

Figure 5:
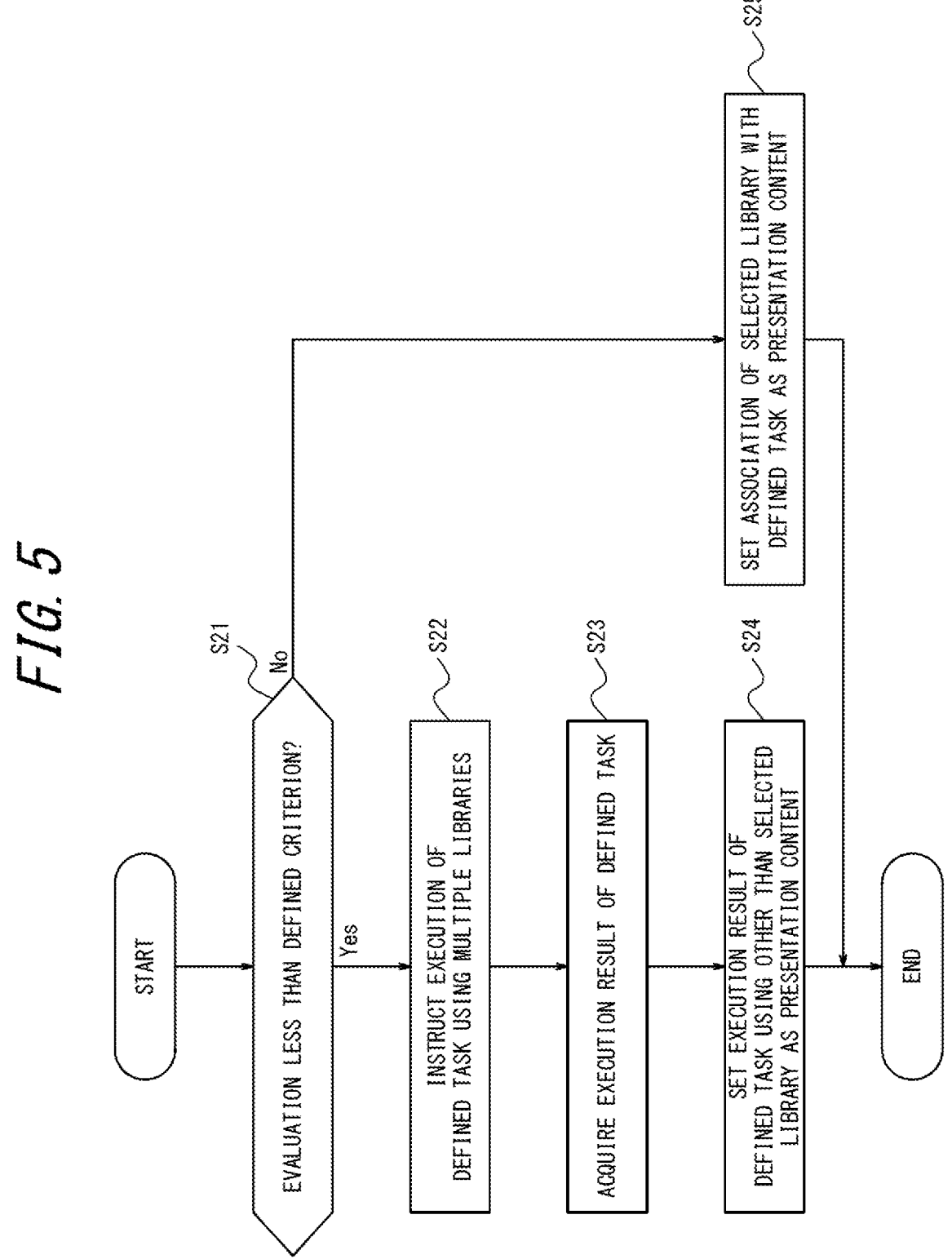
FIG. 5 is a flowchart illustrating an example of processing determining presentation content of a library presenting device.

FIG. 4 is a sequence diagram illustrating an example of processing procedure in the library presenting system 1. Further, FIG. 5 is a flowchart illustrating an example of processing determining presentation content of the library presenting device 10. Referring to FIG. 4 and FIG. 5, processing of the library presenting method executed by the library presenting device 10 according to the present embodiment is described.

A user using the library presenting device 10 determines the defined task and inputs the defined task into the communication terminal device 30 (step S1). Here, the description assumes that the defined task is the recognition of the target object in an image including "BOLT C'" and other industrial components and the display of a recognition result, as in the example above.

The user uses a camera of the communication terminal device 30 to image capture the "BOLT C'" and other industrial components to generate a captured image as input information (step S2).

The communication terminal device 30 sends the input information (captured image) to the library presenting device 10 (step S3). The input information acquisition unit 131 of the library presenting device 10 acquires the input information.

The user selects a library and inputs the library into the communication terminal device 30 (step S4). Here, the description assumes the user does not know the details of the library type, and therefore the user has specified the general-purpose library "INDUSTRIAL COMPONENTS".

The communication terminal device 30 sends the user-selected library to the library presenting device 10 (step S5). That is, the communication terminal device 30 sends information to the library presenting device 10 that the library selected by the user is the general-purpose library "INDUSTRIAL COMPONENTS".

The presentation content determination unit 134 of the library presenting device 10 sends the input information acquired via the input information acquisition unit 131 and the information on the specified library (the general-purpose library "INDUSTRIAL COMPONENTS") to the library generation management device 20 to cause execution of the defined task (step S6).

The library generation management device 20 executes the defined task (step S7).

The library generation management device 20 sends the execution result of the defined task to the library presenting device 10 (step S8). The result acquisition unit 132 of the library presenting device 10 acquires the execution result of the defined task.

The presentation content determination unit 134 of the library presenting device 10 sends the execution result of the defined task to the communication terminal device 30 (step S9). The execution result of the defined task is displayed on the user interface 35 (touch panel display) of the communication terminal device 30.

The user evaluates the execution result of the defined task and inputs the evaluation to the communication terminal device 30 (step S10). The evaluation may be in terms of precision and recall. The user may further input an expected result (expected precision, recall, and the like) into the communication terminal device 30 as the evaluation.

The communication terminal device 30 sends the evaluation input by the user to the library presenting device 10 (step S11). The evaluation acquisition unit 133 of the library presenting device 10 acquires the evaluation. Here, when the expected result is preset, the evaluation acquisition unit 133 may proceed to step S12 without receiving the evaluation from the user.

The presentation content determination unit 134 of the library presenting device 10 executes processing determining the presentation content based on the evaluation acquired via the evaluation acquisition unit 133 (step S12). Processing determining presentation content is executed according to the flowchart in FIG. 5, as described below.

The presentation content determination unit 134 of the library presenting device 10 sends the presentation content to the communication terminal device 30 for display on the user interface 35 (touch panel display) (step S13). The user may check whether the target object is identified using the library of the library group based on the presentation content.

The library presenting device 10, for example, executes the processing determining the presentation content as follows. When the evaluation by the evaluation acquisition unit 133 is less than the defined criterion (Yes in step S21), the presentation content determination unit 134 executes an execution instruction for the defined task using a library other than the user-selected library (step S22). The presentation content determination unit 134 instructs the library generation management device 20 to execute the defined task using a library associated with the library selected by the user. As described above, the presentation content determination unit 134 selects a library based on the relation information stored in the storage 12. For example, when the library selected by the user is the general-purpose library "INDUSTRIAL COMPONENTS", then the specialized library "BOLTS", the same user's custom library or the like is selected. Further, the presentation content determination unit 134 may be instructed to combine multiple libraries to execute the defined task. Here, the defined criterion may be predetermined or may be determined based on the expected result entered in step S10, for example.

The result acquisition unit 132 acquires the execution result of the defined task using the library other than the user-selected library (hereinafter also referred to as "non-user-selected library") (step S23).

The presentation content determination unit 134 sets the execution result of the defined task using the non-user-selected library as the presentation content (step S24). The non-user-selected library includes, for example, a specialized library unknown to the user. A specialized library recognizes the target object in a smaller category than, for example, a general-purpose library, and is therefore more likely to meet user requirements. Accordingly, the presentation content determination unit 134 is able to present a more suitable library even when the evaluation of the defined task using the user-selected library is low. Here, the presentation content determination unit 134 may evaluate the execution result of the defined task using the non-user-selected library based on the expected result (such as expected precision and recall) acquired via the evaluation acquisition unit 133. In such a case, the presentation content determination unit 134 may set the presentation content after evaluation of the execution result of the defined task using the non-user-selected library.

Further, when the evaluation is greater than or equal to the defined criterion (No in step S21), the presentation content determination unit 134 sets association of the user-selected library with the defined task as the presentation content (step S25). For example, the defined criterion may be a criterion for a percentage of correct recognition, such as precision of 90% or more. In this example, when the evaluation is greater than or equal to the defined criterion, the presentation content determination unit 134 presents the user-selected library as having a high percentage of correct recognition and few miscategorizations. When the evaluation is less than the defined criterion, the presentation content determination unit 134 is able to present a more suitable library (non-user-selected library) as the percentage of correct recognition by the user-selected library is low.

Figure 6:
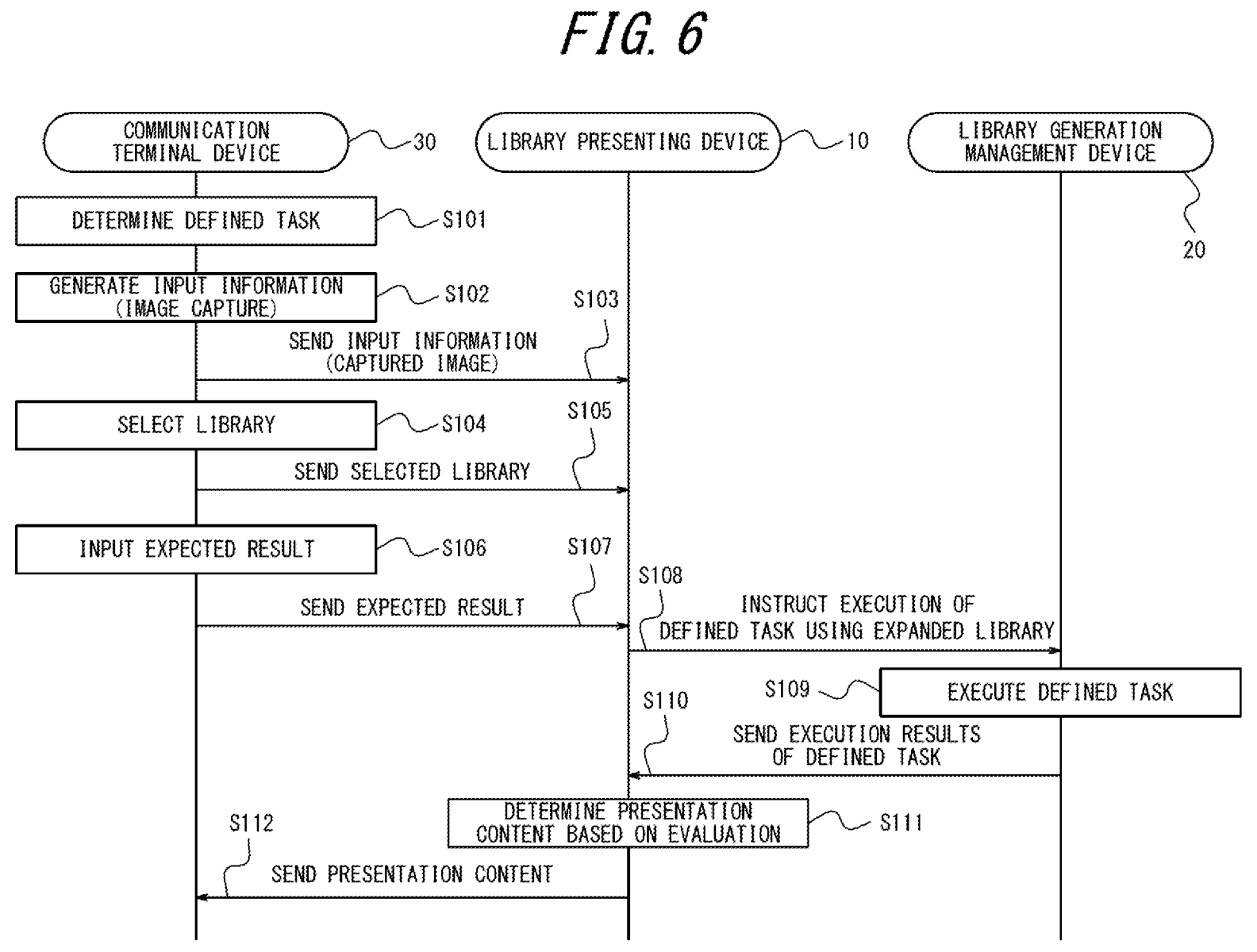

Here, in the example in FIG. 4, the library presenting device 10 waits for the user evaluation before executing the defined task using the non-user-selected library, but execution of the defined task without waiting for the user evaluation is also possible. FIG. 6 is a sequence diagram illustrating another example of the processing procedure in the library presenting system 1.

Step S101 to step S105 in FIG. 6 are the same as step S1 to step S5 in FIG. 4, and therefore explanation is omitted here.

The user inputs the expected result into the communication terminal device 30 (step S106). The expected result is, for example, the expected precision and recall, as described above.

The communication terminal device 30 sends the expected result input by the user to the library presenting device 10 (step S107). The evaluation acquisition unit 133 of the library presenting device 10 acquires the expected result.

The presentation content determination unit 134 of the library presenting device 10 provides an execution instruction for the defined task using an expanded library (step S108). Library expansion means specifying the use of a non-user-selected library in addition to the user-selected library. The non-user-selected library may be selected based on relation information.

The library generation management device 20 executes the defined task (step S109). The library generation management device 20 executes the defined task multiple times using multiple libraries.

The library generation management device 20 sends multiple execution results of the defined task to the library presenting device 10 (step S110). The result acquisition unit 132 of the library presenting device 10 acquires the multiple execution results.

When the defined task is executed using a non-user-selected library without waiting for user evaluation, the evaluation acquisition unit 133 of the library presenting device 10 does not execute receiving processing. For example, the evaluation acquisition unit 133 may determine whether or not each execution result is greater than or equal to the expected result based on the preset expected result and the multiple execution results, and acquire evaluations accordingly.

The presentation content determination unit 134 determines the presentation content based on the evaluations (judgment of whether greater than or equal to the expected result) of the multiple execution results (step S111). The presentation content determination unit 134 may, for example, compare the evaluations of multiple execution results and use the library with the best evaluation and the execution result of the defined task using that library as the presentation content.

The presentation content determination unit 134 of the library presenting device 10 sends the presentation content to the communication terminal device 30 for display on the user interface 35 (touch panel display) (step S112).

As described above, the library presenting device 10 and the library presenting method are able to present a library suitable for the target object. A user is able to know whether or not a suitable library is available in the library group, even before the incorporation of the robot control system 100 or the like that will deploy and operate with the library, or when a new target object needs to be recognized.

The library presenting device 10, library presenting method, and robot control system embodiments are described above, but the present disclosure may also be implemented as a system, a program, or a storage medium on which the program is recorded. A storage medium is, as an example, an optical disk, a magneto-optical disk, a CD-ROM, a CD-R, a CD-RW, a magnetic tape, a hard disk, a memory card, or the like.

Further, a program embodiment is not limited to an application program such as object code compiled by a compiler or program code executed by an interpreter, and may be a program module or the like incorporated into an operating system. Further, a program may or may not be configured so that all processing is performed only in a CPU on a control board. A program may be configured to be implemented in whole or in part by another processing unit mounted on an expansion board or expansion unit added to a board as required.

The drawings illustrating embodiments of the present disclosure are schematic. Dimensional ratios and the like of the drawings do not necessarily correspond to reality.

Although embodiments of the present disclosure have been described based on the drawings and examples, it should be noted that a person skilled in the art may make variations and modifications based on the present disclosure. Therefore, it should be noted that such variations and modifications are included within the scope of the present disclosure. For example, functions and the like included in each component or the like may be rearranged, and multiple components or the like may be combined into one or divided, as long as no logical inconsistency results.

The components and processing steps described in the present disclosure may be combined arbitrarily, except in combinations where features are mutually exclusive. Further, each of the features described in the present disclosure may be replaced by alternative features that work for the same, equivalent, or similar purposes, unless explicitly contradicted. Therefore, unless explicitly contradicted, each of the disclosed features is merely an example of a comprehensive set of identical or equivalent features.

Further, embodiments according to the present disclosure are not limited to any of the specific configurations of the embodiments described above. The embodiments according to the present disclosure may be extended to all novel features described, or combinations thereof, or all novel methods or processing steps described, or combinations thereof.

In the present disclosure, "first", "second", and the like are identifiers to distinguish such configurations. Configurations distinguished by "first", "second", and the like in the present disclosure may be interchangeably numbered. For example, a first category may exchange identifiers "first" and "second" with a second category. Such exchange of identifiers takes place simultaneously. Even after such an exchange of identifiers, relevant configurations remain distinct. Identifiers may be eliminated. Configurations with an identifier eliminated are distinguished by a reference sign. The description of identifiers such as "first" and "second" in the present disclosure may not be used as a sole basis for interpreting an assigned order of such configurations or determining the existence of identifiers with smaller ordinal numbers. For example, an interchange of the "first" and "second" identifiers in the claim description, such as first library and second library, is also included in the scope of the present disclosure.

REFERENCE SIGNS LIST

1 library presenting system
2 robot
2A arm
2B end effector
4 camera
5 influence zone
6 work start point
7 work target point
8 work target object
10 library presenting device
11 communicator
12 storage
13 controller
20 library generation management device
30 communication terminal device
31 communicator
32 storage
33 controller
34 input information generator
35 user interface
40 network
100 robot control system
110 robot control device
131 input information acquisition unit
132 result acquisition unit
133 evaluation acquisition unit
134 presentation content determination unit

The invention claimed is:

1. A library presenting device comprising:
a memory configured to store data and executable instructions:
a controller communicatively coupled with the memory and configured to execute instructions stored in the memory;
wherein the controller is further configured to:
acquire input information via a network, the input information including a target object;
acquire results of applying defined tasks with respect to the input information by using libraries, each of the libraries configured to execute tasks with respect to the input information;
acquire a first evaluation of a first result of the results, the first result acquired by using the first library of the libraries;
determine output of a second result of the results based on the first evaluation being less than a defined criterion, the second result acquired by using the second library of the libraries; and
control a robot to interact with the target object based on the second result.

2. The library presenting device according to claim 1, wherein the controller is further configured to:
acquire the results having a result acquired by using at least two of the libraries, and
cause a third result of the results to be presented, the third result acquired by using a combination of the second library and a third library of the libraries.

3. The library presenting device according to claim 1, wherein the controller is further configured to acquire the first evaluation based on an expected result with respect to at least one defined task of the defined tasks in response to the expected result being acquired.

4. The library presenting device according to claim 1, wherein the controller is further configured to acquire the second result by the second library having a defined association with the first library based on relation information defining association between the libraries.

5. The library presenting device according to claim 1, wherein the libraries include at least one general-purpose library configured to recognize the target object in a first category and at least one specialized library configured to recognize the target object in a second category that is a subdivision of an item of the first category.

6. The library presenting device according to claim 5, wherein the controller is further configured to acquire the results having a result by using general-purpose libraries of the at least one general-purpose library or using both the at least one general-purpose library and the at least one specialized library.

7. The library presenting device according to claim 1, wherein the controller is further configured to acquire a second evaluation of the second result, and cause a proposal for generating a new library to be presented in response to the second evaluation being less than a defined criterion.

8. The library presenting device according to claim 1, wherein claim 1, Wherein the first library and the second library are configured as machine learning models configured to recognize the target object, and the defined tasks are executed based on the results of recognizing the target object.

9. A library presenting method, comprising:

acquiring input information including a target object;

acquiring results of applying defined tasks with respect to the input information by using libraries, each of the libraries configured to execute a task with respect to the input information;

acquiring a first evaluation of a first result of the results, the first result acquired by using the first library of the libraries;

determining output of a second result of the results based on the first evaluation being less than a defined criterion, the second result acquired by using the second library of the libraries; and controlling a robot to interact with the target object based on the second result.

10. A robot control system comprising:

a robot; and a robot control device configured to download at least one library presented by a library presenting device and configured to control the robot, wherein the library presenting device comprises:

a memory configured to store data and executable instructions;

a controller communicatively coupled with the memory and configured to execute instructions stored in the memory, wherein the controller is further configured to:

acquire input information via a network, the input information including a target object;

acquire results of applying defined tasks with respect to the input information by using libraries, each of the libraries configured to execute tasks with respect to the input information;

acquire a first evaluation of a first result of the results, the first result acquired by using the first library of the libraries;

determine output of a second result of the results based on the first evaluation being less than a defined criterion, the second result acquired by using the second library of the libraries; and control a robot to interact with the target object based on the second result.

\* \* \* \* \*